D. C. McCallum.
Truss Bridge.
No. 739. Reissued Jun. 21, 1859.
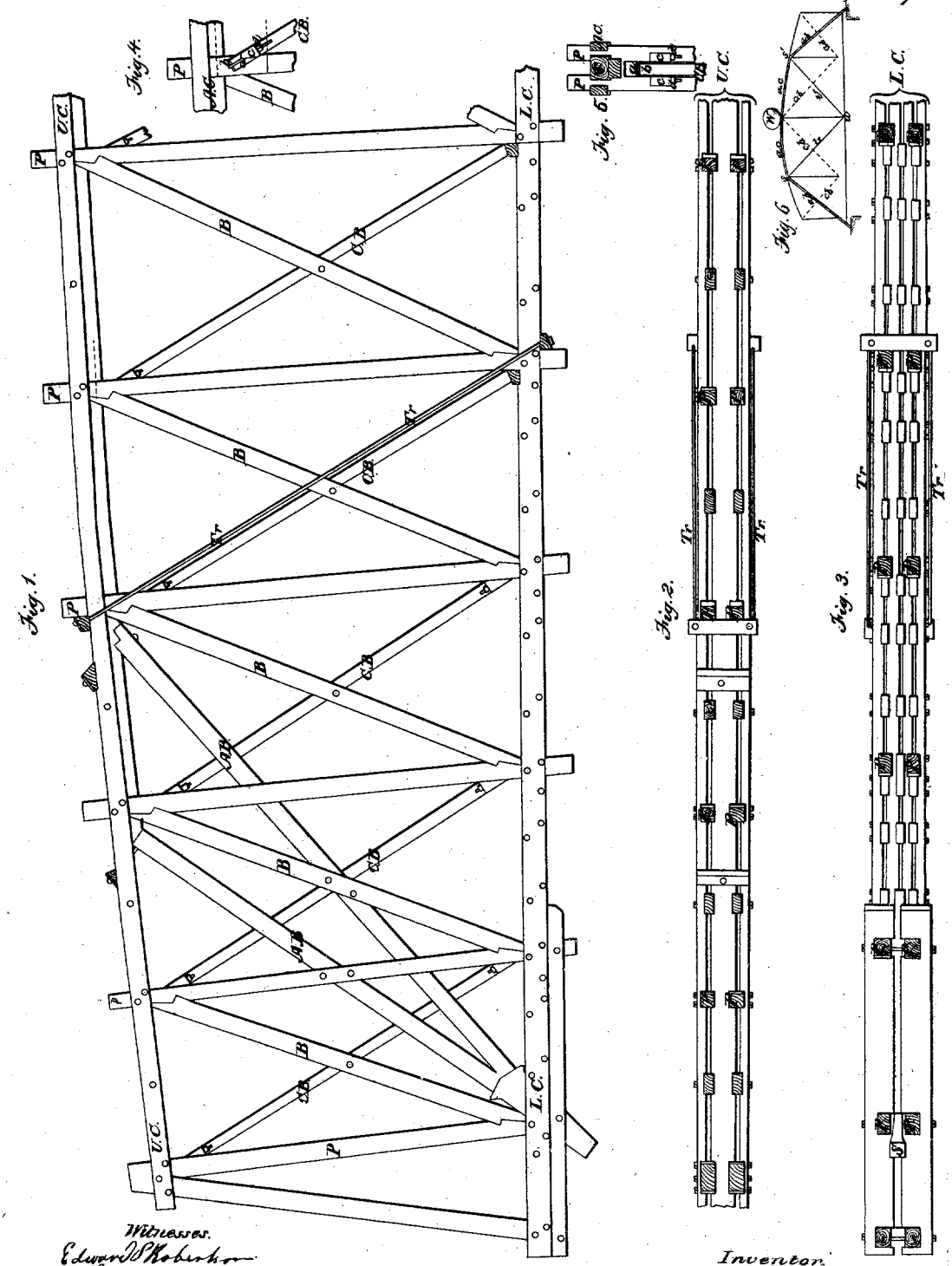
Witnesses.
Edward S. Robertson
Chas. A. Runge
Inventor.
D. C. McCallum
N. PETERS, PHOTO-LITHOGRAPHER, WASHINGTON, D. C.

UNITED STATES PATENT OFFICE.

D. C. McCALLUM, OF OWEGO, NEW YORK.

IMPROVEMENT IN BRIDGES.

Specification forming part of Letters Patent No. 16,446, dated January 20, 1857; Reissue No. 739, dated June 21, 1859.

*To all whom it may concern:*

Be it known that I, D. C. McCALLUM, of Owego, in the county of Tioga and State of New York, have invented an improvement in the method of constructing bridges, whereby greater strength and stiffness is insured than by any other method now known or practiced; and I do hereby declare the following to be a full, clear, and exact description of the same, reference being had to the accompanying drawings, making part of this specification.

The nature of my invention consists, first, in so combining the arch-chord or beam, the arch-brace, and the abutment or pier of a bridge as that the thrust of the arch shall be thrown down upon the abutment or pier, and any deflection in the lower chord be counteracted by an upper force at the upper ends of the arch-braces; and, secondly, in the method of lengthening or shortening the braces of a bridge truss or girder, by which the truss may be elevated or compressed, as required.

To enable others skilled in the art to make and use my invention, I will proceed to describe the same with reference to the drawings.

Figure 1 in the accompanying drawings shows a side elevation of my bridge-truss or such portion of it from the abutment as is essential to explain its character and action; Fig. 2, a plan of the upper or arched chord; Fig. 3, a plan taken below the bottom chord of the bridge; Figs. 4 and 5, sections showing the arched chord and connections whereby the counter-braces are shortened or lengthened—viz., an iron yoke, *a*, an iron plate, *b*, on the end of the counter-brace, and the iron straining-pieces *c c* and nuts *d d*.

P P P are posts of the bridge in pairs, let in between the timbers of both upper and lower chords, as represented, and radiating from a common center, or nearly so; U C and A C, upper or arched chord, in four or any other desirable number of pieces, bolted together in the plan, Fig. 2, and in the section, Fig. 5; L C, lower chord, in four or any other desirable number of pieces, bolted together, as shown in the plan, Fig. 3; B B B, main braces, which are double in each panel and notched into the head and foot of each alternate post, as shown in Fig. 1; C B C B C B, counter-braces which are in each panel, susceptible of adjustment by the action of the nuts *d d* (on the yoke *a*) against the straining-pieces *c c*, let into the posts; A B A B, arch-braces abutting against the arch-chord A C and united in one cast-iron shoe, S, which bears on or against the abutment or pier, passing between the timber of the lower chord without being secured to them in any way; A C, the arched chords; T *r*, the extension-rods, of wrought-iron, furnished at each end with clamp-pieces of wood and iron, as represented.

The advantage of my improved arrangement of bridge-timbers may be stated as follows: It is customary to introduce an arch-rib in bridges, and which in ordinary cases fails to act in unison with the truss; hence there are two systems—the truss proper and the arch rib—and as it is extremely difficult, if not impossible, so to adjust the two systems that they shall act in perfect unison, the result must of necessity be a partial failing or yielding of one before the efficient action of the other can be brought into play. In my bridge a contrary effect is produced. The arched upper chord is a component part of the truss, and so far from its action being independent of the remaining timbers which go to make up the frame, its proper action is essential to the integrity of the truss itself, as may be illustrated by reference to the sketch numbered 6 in the accompanying drawings, and which, it might be proper to state, is merely shown for illustration. Let *a c* represent the arched upper chord; *t r*, the tension-rods tying the extremity of the arched chord to a point on the lower chord; *a b*, the arched braces abutting against the ends of the arched chord and resting on the top of the abutment.

It is obvious that in resisting the action of the weight W before the upper chord can be depressed in its center the points *s s'* must move horizontally outward from the center, bringing an upward action on the tension-rods in the direction *w s* and *w s'*, and at the same time communicating a thrust by means of the arch-braces *a b* to the abutment or pier. While in this condition, under the action of a great weight, if the heads of the counter-braces be wedged against the upper or lower chord, the bridge-frame cannot return to its original position, but subjects the counter-braces to a strain when the weight is removed equal to that weight, and the only effect of an equal or less weight on the bridge thereafter will be to relieve the strain from the counter-brace.

If instead of wedges, which (besides bending when drawn to split the tenons) are liable to shrink and become loose, the heads of the counter-braces be covered by an iron plate, *b*, Figs. 4 and 5, and an iron yoke, *a*, with threads cut at its ends, be passed over the plate and through straining-pieces of metal, *c*, which, with a square bearing-shoulder, are let into each post, by screwing the nuts *d* any desirable amount of strain may be brought against the ends of the counter-braces, thus acting as wedges are designed to act, preserving a strain of deflection on the bridge while unloaded, which the action of the passing load transfers to the braces, or, rather, does not augment.

In all bridges which I have examined which have failed to sustain the passing weight I find that the point of greatest curvature, or the point which suffers the greatest strain from a change of shape in the framing, is not at the center of the truss, but at a point much nearer the abutment or pier, and the increased deflection at this point, bringing an increased strain on this part of the chord, in many cases produces fracture at this point. In fact, all ruptured chords in my experience have parted at a point much nearer to the abutment than to the center of the span. By my method of construction I entirely avoid this local strain, and have proved by the most severe practical tests that I have produced a bridge efficacious beyond precedent in sustaining heavy burdens and recovering its proper shape after the strain or weight has been removed from it. In the construction of bridges heretofore so self-evident has been the fact that the weak point of the truss is at a point nearer the ends than in the middle, that it has almost been a universal custom to introduce spur-braces, resting against the face of the abutment and bearing against the under part of the lower chord. The action of these braces sometimes cripples the bridge, but they are themselves so exposed to injury from their position that, if essential to the strength of the bridge, the latter is endangered by their liability to be carried away by drift or otherwise. When arches are introduced into the framing of a bridge, they are frequently carried through or by the lower chord, and, resting or abutting against the face of the abutment, serve as spur-braces, and are liable to all the objections incident to their use. The action of my improved combination, on the contrary, tends to support and sustain this hitherto weak point, and with my improved method of adjusting the counter-braces, as described, constitutes, as I maintain, an essential improvement in bridge framing and building.

Carrying the arch-braces past the lower chord without uniting them in any way is an important element in this bridge, as it brings the thrust directly upon the abutment or pier; and it is obvious that any union or fastening between the arch-brace and lower chord would bring a portion of the thrust upon the chord, instead of carrying it past the chord and directly to the abutment or pier. Should the arch-brace and chord be united by framing or by bolts, the timber would crush until the thrust or the main portion of it would rest directly upon the abutment or pier, and for this reason I prefer to take the thrust where it is most proper that it should be in the beginning.

Having thus fully described the nature of my invenion, what I claim therein as new, and desire to secure by Letters Patent, is—

1. So combining the arch-chord or beam, the arch brace, and the abutment or pier of a bridge as that the thrust of the arch shall be thrown down upon the abutment or pier and any deflection in the lower chord be counteracted by an upward force at the upper ends of the arch-braces, substantially as described.

2. The method of lengthening or shortening the braces of a bridge truss or girder, by which the truss may be elevated or depressed, as required, by means of the yoke *a*, the plate *b* on the end of the brace, and the straining-pieces *c c*, with their nuts *d*, substantially in the manner herein described.

D. C. McCALLUM.

Witnesses:
CHARLES A. MUNGER,
EDWARD P. ROBERTSON.